(12) United States Patent
Novikov (10) Patent No.: US 9,875,216 B2
(45) Date of Patent: Jan. 23, 2018

(54) NP-PROCESSOR (71) Applicant: Anatoliy Anatolievich Novikov, Kharkov (UA)

(72) Inventor: Anatoliy Anatolievich Novikov, Kharkov (UA)

( * ) Notice: Subject to any disclaimer, the term of this patent is extended or adjusted under 35 U.S.C. 154(b) by 188 days.

(21) Appl. No.: 14/768,114

(22) PCT Filed: Mar. 14, 2014

(86) PCT No.: PCT/UA2014/000030
§ 371 (c)(1),
(2) Date: Aug. 14, 2015

(87) PCT Pub. No.: WO2014/142777
PCT Pub. Date: Sep. 18, 2014

(65) Prior Publication Data
US 2016/0004663 A1      Jan. 7, 2016

(30) Foreign Application Priority Data

Mar. 15, 2013   (UA) ................................ 2013030194

(51) Int. Cl.
G06F 17/11     (2006.01)
G06G 7/122    (2006.01)
G06G 7/32      (2006.01)

(52) U.S. Cl.
CPC ............. *G06F 17/11* (2013.01); *G06G 7/122* (2013.01); *G06G 7/32* (2013.01)

(58) Field of Classification Search
None
See application file for complete search history.

(56) References Cited

U.S. PATENT DOCUMENTS

| 3,764,919 | A | 10/1973 | Baxter | |
|---|---|---|---|---|
| 3,893,086 | A | 7/1975 | Nanya | |
| 7,130,093 | B2 * | 10/2006 | Dolev | G06E 1/00 359/107 |
| 8,577,825 | B2 * | 11/2013 | Gillespie | G06F 17/11 706/46 |
| 2005/0013531 | A1 | 1/2005 | Dolev et al. | |

(Continued)

FOREIGN PATENT DOCUMENTS

CA        2714346 A1     3/2012

OTHER PUBLICATIONS

Novikov A.A., "Vydelenye chastey v grafe otnosheny, izomorfnykh dannomu grafu"[Identification of parts in a relational graph that are isomorphic to a prescribed graph] Respublikanskiy mezhvedomstvennyy nauchno-tekhnicheskiy sbornik "Problemy Bioniki", No. 21, "Vysshaya shkola" Publishing House, 1978, p. 1293.

*Primary Examiner* — David H Malzahn
(74) *Attorney, Agent, or Firm* — Maynard, Cooper & Gale, P.C.; Brian Sattizahn (57) ABSTRACT

An NP-processor is provided that is based on a computing environment consisting of a finite set of multiple-element triggers that are interconnected by common elements. The NP-processor has interference relations between the computing environment elements. Negative feedback is introduced and is intended for isolating an active state, which is the solution to the problem, from an exponential number of modes of oscillation in the computing environment.

2 Claims, 4 Drawing Sheets

(56) References Cited

U.S. PATENT DOCUMENTS

2007/0097895 A1* 5/2007 Keshavarzian ... H04W 52/0219
370/311
2011/0161266 A1 6/2011 Gillespie
2016/0004663 A1* 1/2016 Novikov ................ G06G 7/122
708/446

* cited by examiner

NP-PROCESSOR

FIELD OF THE INVENTION

The invention relates to computer technology and can be used as a processor or a co-processor for solving exponential complexity problems (NP-problems) in time that is a polynomial function of the amount of input data. The main object of the invention is to build artificial intelligence systems based thereon.

STATE OF THE ART

Modern computers based on algorithmic principles effectively solve all the problems for which algorithms are developed in the form of programs. But, apart from the algorithmically solvable problems, there is a broad class of problems for which there are no algorithms for a volume of computations that grows slower than the exponent of the amount of input data; these are NP-problems (non-deterministic polynomial problems). A special class among them is NP-complete problems, and all other NP-problems are reduced to any of them. For this reason, a processor that solves one of the NP-complete problems will be a universal NP-processor.

SUMMARY OF THE DISCLOSURE

It is an object of the invention to provide an NP-processor for solving an NP-complete problem of finding in a graph a part that is isomorphic to the preset graph.

The mathematical basis for building an NP-processor is a product of graphs that was first proposed by Vining, V. G. ("Reduction of the problem of isomorphism and isomorphic entrance to the task of finding the non-density of a graph", Proc. 3rd All-Union Conf. Problems of Theoretical Cybernetics, 1974, p. 124.). A similar result was obtained by Novikov A. A. independently with respect to problems of pattern recognition ("Vydelenye chastey v grafe otnosheny, izomorfnykh dannomu grafu" [Identification of parts in a relational graph that are isomorphic to a prescribed graph] Respublikanskiy mezhvedomstvennyy nauchno-tekhnicheskiy sbornik "Problemy Bioniki", No. 21, "Vysshaya shkola" Publishing House, 1978, p. 129). The same source contains a suggestion that if a product of graphs determines neural connections in an ensemble, then a set of neurons whose connections are determined by a full graph is more predisposed to stimulation, which may be proof of the existence of mechanisms for solving the above-mentioned problem at the neuron level.

An abstract device that solves NP-problems in polynomial time is a nondetermiinistic Turing machine (Karpov, Yu. G, 2003, "Teoriya avtomatov" [Theory of Automatons], Peter, 208 pp.) U.S. patent No. 20050013531 claims the implementation of a nondeterministic Turing machine based on parallel optical computing. However, no fully functional electronic implementation has been achieved so far.

An NP-processor according to the invention, similarly to a nondeterministic Turing machine, creates an individual machine for each problem path, which is a virtual machine that comprises elements of a finite set by combining them. The number of the virtual machines also exponentially depends on the number of elements in the set similar to the dependence of the scope of computations for solving NP-problems on the amount of input data. The number of elements necessary to build the virtual machines is a polynomial function of the amount of input data.

The exponential number of the virtual machines solves an exponential complexity problem in polynomial time.

The virtual machines compete (interfere with each other) in mutual superposition. The solution is a machine that will keep the specified number of elements in the active state. Only this approach allows for solving NP-problems in polynomial time without violating the fundamental results of the theory of complexity of algorithms (Christos H. Papadimitriou, 1994, Computational Complexity, Addison-Wesley.)

The invention is based on known N×K-element (N>K) matrix trigger (U.S. Pat. No. 3,764,919, Oct. 9, 1973, Filed: Dec. 22, 1972, FIG. 9) in the particular case of NP-processor implementation, which solves NP—the complete search task in a complete graph with N vertexes of a subgraph with K vertexes. Any of the possible N×K matrix trigger states can be represented as the placement of K vertexes K—complete vertex graph on N vertexes of the complete N-vertex graph. in turn, matrix trigger belongs to a whole class of devices consisting of multiple-unit triggers.

Known NP-processor comprising a finite set of multiple-element triggers, with the elements of the multiple-element triggers having inputs for setting to the active state or inputs for prohibiting the setting to the active state, wherein the allocation of active states to the elements of the multiple-element triggers represents a solution to the problem, according to the claimed invention the sums of the values of the active states of subsets of the trigger elements are computed for each multiple-element trigger by analog or logical adders based on the specification of the problem that is to be solved, any of the computed sums or inactive signals, depending on the problem specification, are fed to the inputs prohibiting the setting to the active state or to the inputs for setting to the active state of any element of any multiple-element trigger, and controlled negative feedback that is independent of the problem specification is introduced for each element of each multiple element trigger in order to exclude the states that do not represent a solution of the problem, with the intensity of the negative feedback for all elements of any multiple-element trigger being determined by an analog or a logical sum of the values of the excess of its sum of the active states of all elements over similar sums for the other multiple-element triggers, wherein the excess values are computed by analog or logical comparators, and the sum of the excess values is determined by an analog or logical adder.

Also known NP-processor comprising a finite set of multiple-element triggers, with the elements of the multiple-element triggers having inputs for setting to the active state or inputs for prohibiting the setting to the active state, wherein the allocation of active states to the elements of the multiple-element triggers represents a solution to the problem, according to the invention the sums of the values of the active states of subsets of the trigger elements are computed for each multiple-element trigger by analog or logical adders based on the specification of the problem that is to be solved, any of the computed sums or inactive signals, depending on the problem specification, are fed to the inputs prohibiting the setting to the active state or to the inputs for setting to the active state of any element of any multiple-element trigger, and an analog or a logical sum of the values of the excess of its sum of the values of the active states of all the elements over similar sums for the other multiple-element triggers is fed to the inputs for setting to the active state all elements of each multiple-element trigger in order to excludes the states that do not represent a solution of the problem, wherein the excess values are computed by analog or logical comparators, and the sum of the excess values is determined by an analog or logical adder.

BRIEF DESCRIPTION OF THE DRAWINGS

Embodiments of the present invention and its constructive elements will hereinafter be described in conjunction with the following drawing figures.

EMBODIMENT OF THE INVENTION

Figure 1:
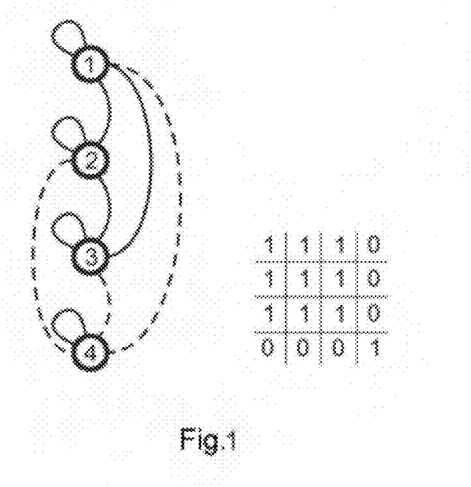
FIG. 1—Graphical view of four-peaks graph and its adjacency matrix.
Figure 2:
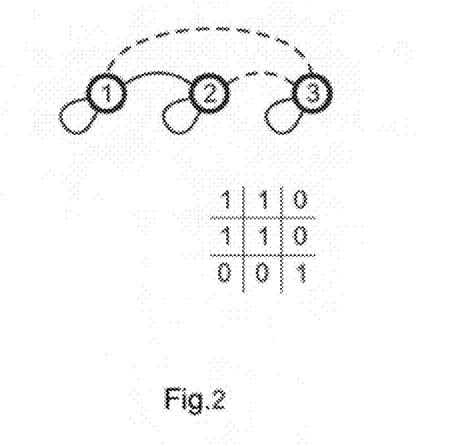
FIG. 2—Graphical view of three-peaks graph and its adjacency matrix.

Let us see how the NP-processor functions using a simple example with a small amount of input data. Let us take two graphs: one that has three peaks and the other that has four peaks. The graphs are defined by their adjacency matrices (FIGS. 1, 2). We will be searching for a part of the four-peak graph that matches the three-peak graph.

To facilitate further discussion, the lack of connection between the vertices of the graph corresponding to zero in the adjacency matrix is shown with a dashed line between the vertices in the graphical representation of the graphs.

Figure 3:
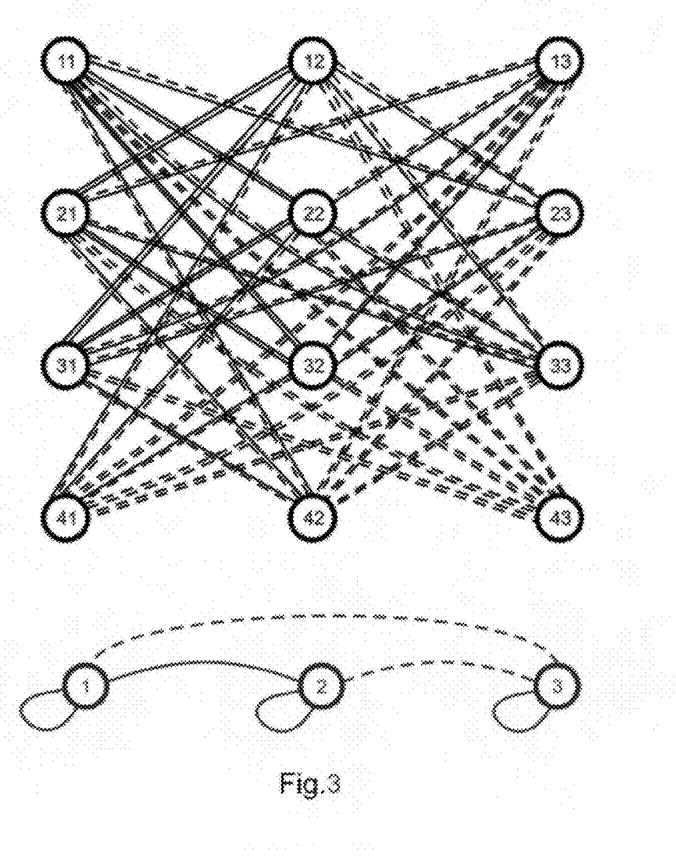
FIG. 3—Auxiliary graph which illustrates construction of making graphs.

Let us plot an auxiliary graph consisting of twelve vertices, i.e. four peaks of the four peak graph arranged in the form of vertical columns replicated three times. Let us connect the vertices of all pairs of columns in the same manner as they are connected in the above-mentioned four-peak graph, without connecting the vertices of the middle columns (FIG. 3).

Let us place the three peaks of the three-peak graph with respective edges horizontally under the auxiliary graph. Let us designate the vertices in each column of the auxiliary graph using the number of the vertex of the three-peak graph that is located under the column that is being designated as the second digit of the designation. Further, let us connect pairwise the corresponding vertices of each pair of columns of the auxiliary graph with each edge of the three-peak graph (with a solid or dashed line) (FIG. 3). For instance, the first vertex and the second vertex of the three-peak graph are connected with a solid line; then let us use a solid line to connect each pair of the vertices of the first and second columns of the auxiliary graph that have non-matching first digits of their designation.

Let us plot a graph which is the product of the four-peak graph and three-peak graph using the following convention. If the edges of the auxiliary graph and the three-peak graph are aligned (a solid line is aligned with a solid line or a dashed line is aligned with a dashed line), then we can replace them with an edge, and if they are not aligned, we will not draw anything. As a result, the product of the graphs is obtained (FIG. 4).

Figure 4:
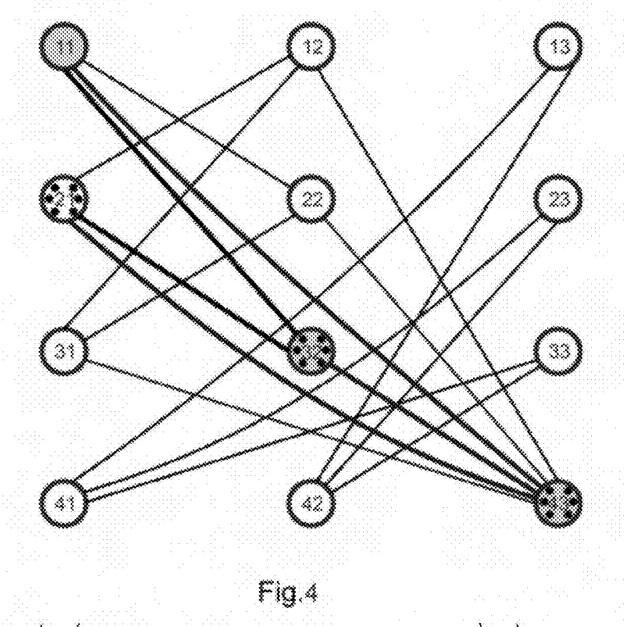
FIG. 4—Graphical representation of making graphs.

Let us analyze the structure obtained between vertices 11, 32, 43 and 21, 32, 43 of the product of the graphs by highlighting the vertices of the graph of this part with gray color and dots (FIG. 4). The first digit of each of the two sets of pairs of digits indicates a vertex of the four-peak graph to which a vertex of the three-peak graph is to be matched in order that the three-peak graph matches a part of the four-peak graph. The highlighted structure in the product of the graphs forms two complete three-peak graphs which have common vertices and represent two solutions to the problem. However the problem of identifying complete subgraphs (cliques) is also an NP-complete problem and it cannot be solved so easily with a larger number of graph vertices.

When an NP-processor is built on an electronic or other physical base we can either charge it with performing the above-described transformations or run them on an ordinary computer by reducing the initial NP-problem to an NP-problem of finding complete subgraphs in a product of graphs.

The first option leads to higher hardware costs, however, a device that solves the NP-problem of finding a complete subgraph will be a specific case of implementation of a device that solves the NP-problem of finding parts in a graph that are isomorphic to a prescribed graph.

Let us discuss the construction of a product of graphs (FIG. 4) and the placement of vertices of a complete subgraph on it—the solution. Let us use any of the two solutions. The main characteristic of the solution is that each column of the product of graphs must have one vertex of a complete subgraph—the solution, and there must be no more than one vertex in each row.

I. An NP-processor will need a computational matrix environment that has four rows of three elements or, in general, N rows and K columns, where N is greater than or equal to K. The environment allows each column to have only one element in a steady active state, and no more than one element in each row in a steady active state.

An NP-processor (FIG. 8) comprises a computing environment 2, a solution readout module 4, an interference module 3, which is used to store and interpret the problem specification, and a dynamic environment elements activity leveling module 1, which is used to monitor the realization of the environment characteristics as per I.

A known N×K-element matrix trigger is used as the computing environment (U.S. Pat. No. 3,764,919, Oct. 9, 1973, Filed: Dec. 22, 1972, FIG. 9). The cited patent specification contains the operation description. One of the options of a 4×3-element matrix trigger is built around NOR gates and is used below as an example of the computing environment 2 (FIG. 8) for the NP-processor. The computing environment comprises a set of multiple-element triggers, more specifically, of four three-element triggers and three four-element triggers connected to each other by means of common elements so that setting a common element to the active state results in setting all the elements of the multiple-element triggers interconnected by means of the common element to the inactive state. Elements of the multi-element triggers each have two inputs that prohibit setting to the active state. Additional inputs may be added for configuring and for interfacing with other devices. The computing environment according to the invention as well as ail the embodiments given below can by analogy be expanded to obtain practical values of N and K.

Allocation of stationary active states of the 4×3-element matrix triggers, similarly to allocation of the vertices of the complete subgraph in the product of graphs (FIG. 4), will represent a solution to the problem: it is sent to the solution readout module 4, which is not detailed herein.

To solve NP-problems in the computing environment, we introduce mutually suppressing (interfering) relations between elements of different columns of the computing environment, which depend on the problem specification. The connections are introduced between the elements for which their respective vertices of the product of graphs are not related. This part of the NP-processor, the interference module 3, also has a matrix structure, 4×3 (FIG. 8) (N×K in a general case), and consists of 12 (N×K) elements.

Figure 7:
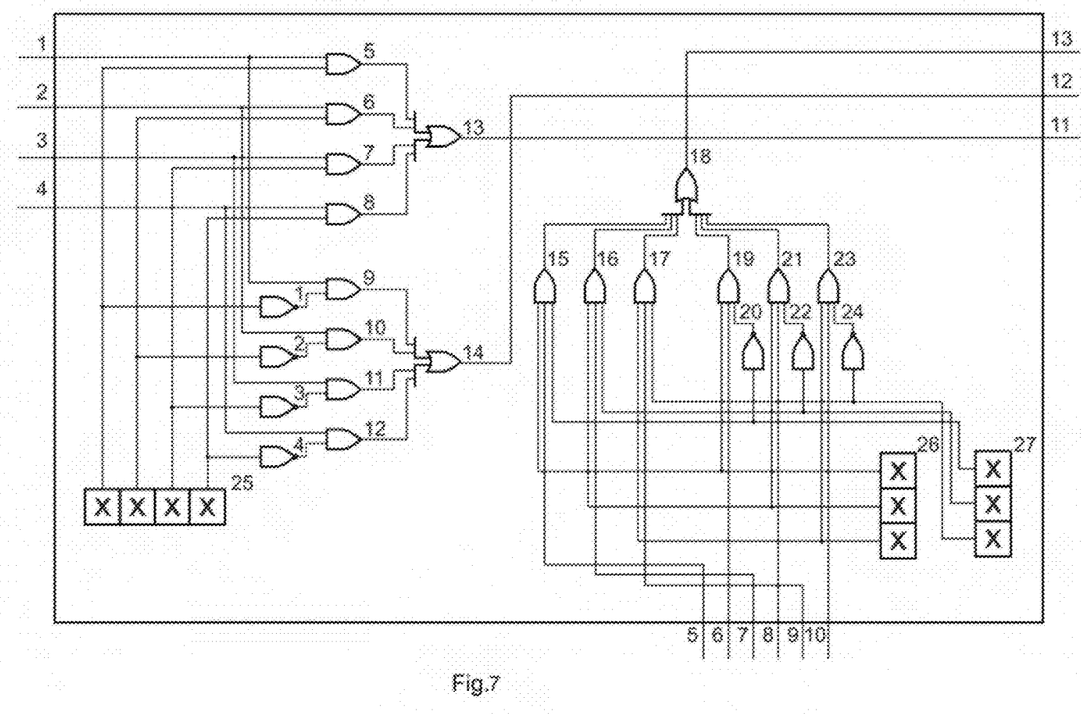
FIG. 7—nk scheme of interference block element.
Figure 8:
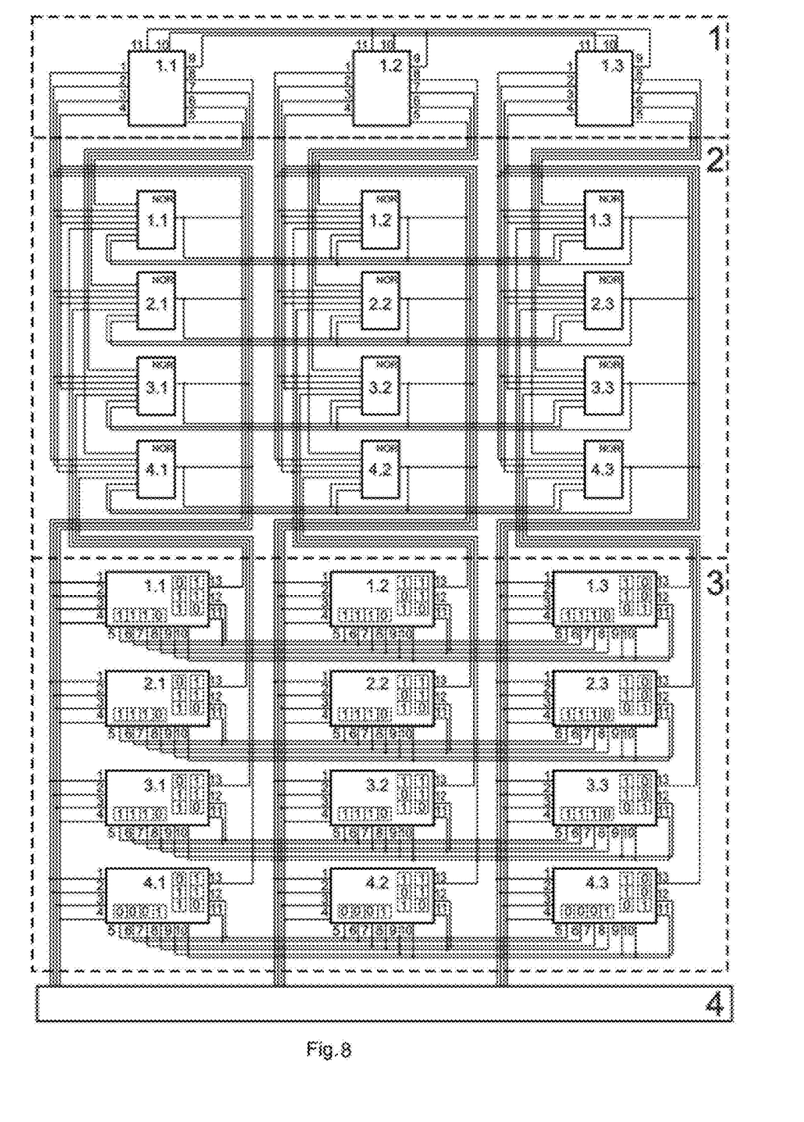
FIG. 8—Block-scheme of NP-processor consisting of a computing environment 2, a solution readout module 4, an interference module 3, a dynamic environment elements activity leveling module 1.

One of the potential circuitry solutions of the nk-element of the interference module 3 (FIG. 8) where n is the number of the row in which the element is located and k is the number of the column is shown in FIG. 7. Each nk-element uses the n-th row 25 (FIG. 7) of the adjacency matrix of the four (N)-peak graph (N) and the k-th column 27 (FIG. 7) of the adjacency matrix of the three (K)-peak graph as the input data for solving the NP-problem. Four (N) output signals from the four (N) elements of the k-th column of the computing environment are fed to the input of each nk-element of the interference module. An element in the interference module generates two logical OR operators or analog sums of the output signals of elements from the k-th column of the computing environment. The sums are formed by two adders, 13 and 14 (FIG. 7). The adder 14 (FIG. 7) forms the sum (of the 0-type) from the outputs of elements of the computing environment corresponding to respective zeros in the n-th row of the adjacency matrix (N) of the four-peak graph. The adder 13 (FIG. 7) forms a sum (of the 1-type) from the outputs of the elements of computing environment corresponding to respective unities in the n-th row of the adjacency matrix of the four (N)-peak graph. In order to do this, the values of the n-th row 25 (FIG. 7) of the adjacency matrix of the four (N)-peak graph, which are stored in a module's element, are inverted by inverters 1, 2, 3, 4 (FIG. 7), and the inverted values are gated by switches 9, 10, 11, 12 (FIG. 7), which transmit the signals from the computing environment to the adder 14 (FIG. 7). The non-inverted values of the n-th row are gated by switches 5, 6, 7, 8 (FIG. 7) that transmit the signals from the computing environment to the adder 13 (FIG. 7). The controlled switches can be built around analog switches or logical AND gates. In each row of elements of the interference module, the sums of the two types that are formed by each element in the row are fed to the inputs of all elements of the same row in the interference module (FIG. 8). These sums are added, by types, in the adder 18 of the nk-th element of the interference module (FIG. 7) and are sent to a prohibiting input of the nk-th element of the computing environment. The sum type (0-type or 1-type) is designated as zero or unity in the k-th column 27 (FIG. 7) of the adjacency matrix of the three (K)-peak graph. The value of the mask 26 (FIG. 7) is used to prohibit processing in the nk-th element of its own sums that were generated by the adders 13, 14 (FIG. 7).

The mask can be used to configure the NP-processor for the dimensionality of the NP-problem.

With this circuitry structure, the interference module will physically implement the mathematical procedure for the computation of a product of graphs. For each four-element trigger, analog or logical sums of the active state values of subsets of the elements thereof will be computed based on the NP-problem specification. Any of the computed sums or non-active signals—depending on the problem specification—can be sent to the inputs for prohibiting the setting to the active state any element of any three-element trigger that was connected to the above-mentioned four-element trigger via a common element.

A large number of specific embodiments of the NP-processor circuitry can be created such as, for instance, based on positive or negative logic, analog circuitry, etc.

II. The activity of the nk-th element of the computing environment is blocked via its prohibiting input by the nk-th element of the interference module if any other active element of the computing environment that is located in any other column is not connected with it in the product of graphs (FIG. 4).

Let us discuss operation of the interference module as applied to two vertices, 32 and 13, that are not connected in the product of graphs (FIG. 4). According to clause II, the elements of the computing environment 2 designated as 3.2 and 1.3 (FIG. 8) cannot be in the active state at the same time, and signals prohibiting the elements 32 and 1.3 of the computing environment from transitioning to the active state must be present at the outputs 13 of the corresponding elements of the interference module 3 (FIG. 8).

If the element 3.2 of the computing environment 2 (in the third row and second column) (FIG. 8) is in the active state, then the output 13 of the element 1.3 of the interference module 3 (FIG. 8) must have a signal that prohibits transition of the element 1.3 of the computing environment 2 to the active state (FIG. 8). Here is how it is done.

Let us discuss operation of an interference module element (FIG. 7). For the element 1.3 of the module 3 (FIG. 8), the values of the first row of the matrix of the four-peak graph 25 (FIG. 7), of the mask 26 (FIG. 7), and of the third column 27 (FIG. 7) of the adjacency matrix of the three-peak graph are represented by bit strings "1110", "110" and "001." These bit strings are shown conventionally in the illustration of the element 1.3 of the interference module 3 (FIG. 8).

The output signal of the element is formed by the adder 18 (FIG. 7) and by the part of the circuit associated with the adder. An active signal can be present at the output of the adder only when an active signal is present at least at one output of the elements 15, 16, 17, 19, 21, 23. The elements 17 and 23 (FIG. 7) may be disregarded in further analysis because they are blocked by a zero in the mask 26.

In order to be set to the active state at least one of the remaining elements 15, 16, 19, 21 (FIG. 7), at least one of the inputs 6, 8 of the element 1.3 of the interference module 3 (FIG. 8) must be in the active state. As shown in the circuit schematic (FIG. 8), the input 6 of the element 1.3 of the module 3 (FIG. 8) is connected to the output 11 of the element 1.1 (FIG. 8) of the interference module 3. The element 1.1 (FIG. 8) of the interference module 3 receives at its input 1 the activity signal of the element 1.1 of the computing environment 2 (FIG. 8). The signal from this input goes to the switch 5 inside the interference module (FIG. 7), which is opened by the first unity of the first string "1110" of the four-peak graph adjacency matrix written in the element 1.1 of the interference module 3 (FIG. 8). The signal from the output of the switch 5 (FIG. 7) goes to the input of the adder 13 (FIG. 7), and the signal from the output of the adder 13 goes to the output 11 of the element 1.1 of the interference module 3 (FIG. 8). Therefore, the passage of the blocking signal is completely demonstrated.

Operation of the interference module can also result in any single active element that is not connected to the other elements in the product of graphs suppressing the activity of other elements. The same can occur to any subset of interrelated active elements that have fewer than three (K) vertices, and this will not be a solution to the NP-problem.

III. Irrespective of the problem specification, solutions to the NP-problem can be represented only by three (K) simultaneously active states of the elements that are not mutually blocked, one each in each column of the computing environment. For this, the value of the activity in each of the three (K) columns of the computing environment must not be greater than in the other two (K−1) columns during dynamic changes and transients in the computing environment. A simultaneous and identical increase in the activity of all three (K) elements in different columns almost to a steady state, i.e., to the solution of the NP-problem is achieved by introducing negative feedback between the (K) columns of the computing environment in the module 1 (FIG. 8)—dynamic activity leveling.

Figure 5:
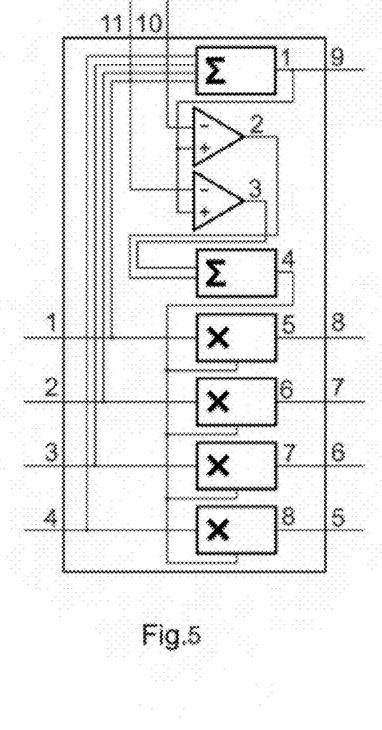
FIG. 5—Alternate scheme of the dynamic activity leveling module according to a first embodiment.
Figure 6:
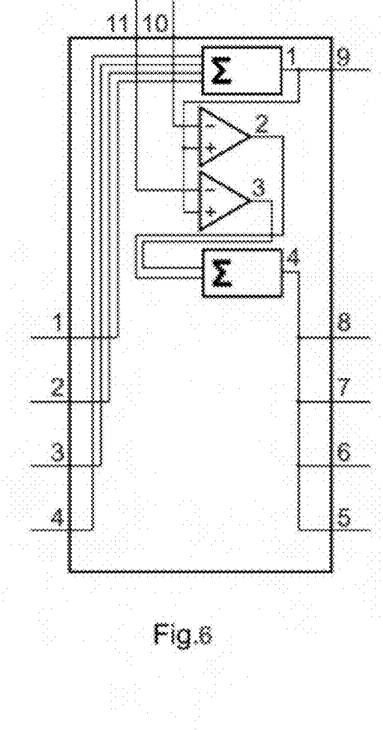
FIG. 6—Alternate scheme of the dynamic activity leveling module according to a second embodiment.

In the two embodiments of elements 1.1, 1.2, 1.3 of the dynamic activity leveling module 1 (FIG. 8) shown in FIGS. 5, 6, the sums of activities of all the elements are initially formed by either analog or logical "OR" adders 1 (FIGS. 5, 6) individually for each column of the computing environment. Therefore there are three (K) sums, and the value of which one of them reflects the dynamic activity of the columns of the computing environment. The values of excess of the column activity over the activity of the other columns are then computed for each column either by analog comparators or by logical comparators 2 and 3 (FIGS. 5, 6). These excess values are added in the analog adder or in the logical adder 4 (FIGS. 5, 6). As a result, the sum of excess values of the column activity over the activity of the other columns, i.e., of the other four-element triggers is computed for each column of the computing environment, i.e., for each four-element trigger. The four-element triggers form a subset of all multiple-element triggers of which the computing environment is composed.

The dynamic activity of each column of the computing environment that has the sum of excess of values over the activity of the other columns which is other than zero must be suppressed according to clause III. In the first embodiment, the activity is suppressed by sending the value of the sum of the excess values to all prohibiting inputs of the column of the computing environment (FIG. 6). In the second embodiment (FIG. 5), the value applied to the prohibiting input of each element of the column of the computing environment is individual and depends on the value of its activity. For that purpose, a controlled intensity negative feedback covers each element of each column of the computing environment. The feedback signal is fed from the output of the element of the computing environment to its prohibiting input via an element of the dynamic activity leveling module. This feedback signal is transmitted, in the element of the dynamic activity leveling module (FIG. 5), through analog switches, or through controlled amplifiers, or through AND gates 5, 8, 7 and 8. The value of the sum of excess values is fed to the intensity control inputs of the negative feedback elements 5, 6, 7, 8 (FIG. 5). The greater the sum of the excess values, the higher the intensity of the negative feedback.

The NP-processor (FIG. 8) functions in the following manner.

A change in the input data that is located in the interference module 3 causes disorder in the current allocation of active states in the computing environment 2. The structure of the interference relations has changed, and some of the active states of the computing environment is suppressed to the inactive state by new interference relations. The other active states are leveled to the inactive state by the dynamic activity leveling module 1. All elements of the computing environment 2 transit to close to inactive states. This computing environment condition is unstable, as is the transition state of a normal binary trigger. Since all elements of the computing environment 2 are covered with positive feedback, a process of chaotic increase in the computing environment elements' activity begins. However, the increase in the activity of any element of the computing environment is limited by mutually prohibiting relations as per the conditions of clause I and by interference relations per clause II. If the activity of an element of any column becomes higher than the value of the activity of an element in another column during the activity increase process, the activity will be suppressed by negative feedback as per clause III. All of the above-described processes occur simultaneously. The interaction of these processes results in fluctuations that involve various combinations of the elements of the computing environment. The number of such combinations (fluctuation forms) as "virtual machines" increases exponentially with an increase in the number of elements of the computing environment. The conditions per clauses II and III result in their mutual suppression or interference.

Only a form of fluctuations that has a coherent and uniform activity increase, which is controlled by the dynamic activity leveling module 1, can reach the maximum activity. Allocation of the maximum steady activity to the elements of the computing environment represents the solution to the NP-problem. The solution is read out by the solution readout module 4.

Because of the negative feedback in the dynamic activity leveling module 1 and in the interference module 3, any change in the input data will lead to a new fluctuation process in the computing environment 2 and a new solution. If no solution to the NP-problem exists, the fluctuation process will go on infinitely or until data that will result in a solution is inputted.

TECHNICAL RESULT

The technical result of the present invention is development of a NP-processor for solving an NP-complete problem of finding in a graph a part that is isomorphic to the preset graph.

The invention claimed is:

1. An NP-processor, comprising:
a computational environment having a set of multiple-element triggers, with the elements of the multiple-element triggers having inputs to receive signals for prohibiting a setting to an active state, wherein an allocation of active states to the elements of the multiple-element triggers represents a solution to the problem, characterized in that an interference module is connected to outputs of the elements of each multiple-element trigger, the interference module having a plurality of adders, wherein, depending on the specification of the problem being solved, subsets of the outputs of the elements are connected to inputs of the plurality of adders, and outputs of the plurality of adders, depending on the specification of the problem being solved, are connected to the inputs to receive signals for prohibiting the setting to the active state of any element of any multiple-element trigger to exclude states that are not a solution to the problem, and a dynamic activity leveling module, the dynamic activity leveling module comprising a plurality of first adders, each first adder having a first adder output connected to the inputs to receive signals for prohibiting the setting to an active state of all elements of each multiple-element trigger taken from a separate set of multiple-element triggers, the first adder output providing a problem statement-independent negative feedback signal based on a sum of output signals from a plurality of comparators connected to a plurality of first adder inputs of the first adder, wherein a first input of each comparator of the plurality of comparators being connected to an output of a second adder of a plurality of second adders, each second adder having inputs connected to all outputs of the elements of the separately taken multiple-element trigger, a second input of each comparator of the plurality of comparators connected to outputs of other second adders of the plurality of second adders, the other second adders having inputs connected to the outputs of all elements of each multiple-element trigger taken from the set of multiple-element triggers apart from the separately taken multiple-element trigger, and wherein each comparator computes a value of excess based on a sum of output signals of the separately taken multiple-element trigger and an analogous sum of each multiple-element trigger taken from the set of multiple-element triggers apart from the separately taken multiple-element trigger.

2. An NP-processor, comprising:

a computational environment having a set of multiple-element triggers, with the elements of the multiple-element triggers having inputs to receive signals for prohibiting a setting to an active state, wherein allocation of active states to the elements of the multiple-element triggers represents a solution to the problem, characterized in that an interference module is connected to outputs of the elements of each multiple-element trigger, the interference module having a plurality of adders, wherein, depending on the specification of the problem being solved, subsets of the outputs are connected to inputs of the plurality of adders, and outputs of the plurality of adders, depending on the specification of the problem being solved, are connected to the inputs to receive signals for prohibiting the setting to the active state of any element of any multiple-element trigger to exclude states that are not a solution to the problem, and a dynamic activity leveling module, the dynamic activity leveling module comprising a plurality of amplifiers, each amplifier of the plurality of amplifiers having an output connected to a corresponding input to receive signals for prohibiting the setting to an active state of an element of each multiple-element trigger taken from a separate set of multiple-element triggers, the amplifier output providing a negative feedback signal based on an amplifier input connected to an output of a corresponding element of the separately taken multiple-element trigger and a gain control input connected to an output of a first adder that provides a problem statement-independent signal based on a sum of output signals of a plurality of comparators connected to inputs of the first adder, wherein a first input of each comparator of the plurality of comparators being connected to an output of a second adder of a plurality of second adders, each second adder having inputs connected to all outputs of the elements of the separately taken multiple-element trigger and a second input of each comparator of the plurality of comparators connected to outputs of other second adders of the plurality of second adders, the other second adders having inputs connected to outputs of all elements of each multiple-element trigger taken from the set of multiple-element triggers apart from the separately taken multiple-element trigger, and wherein each comparator computes a value of excess based on a sum of output signals of the separately taken multiple-element trigger and an analogous sum of each multiple-element trigger taken from the set of multiple-element triggers apart from the separately taken multiple-element trigger.

\* \* \* \* \*